(12) United States Patent
Sigler et al.

(10) Patent No.: US 8,274,010 B2
(45) Date of Patent: Sep. 25, 2012

(54) WELDING ELECTRODE WITH CONTOURED FACE

(75) Inventors: David R Sigler, Shelby Township, MI (US); Michael J Karagoulis, Okemos, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 370 days.

(21) Appl. No.: 12/768,928

(22) Filed: Apr. 28, 2010

(65) Prior Publication Data

US 2011/0266260 A1 Nov. 3, 2011

(51) Int. Cl.
*B23K 11/06* (2006.01)
(52) U.S. Cl. .......................................................... 219/84
(58) Field of Classification Search .................. 219/54, 219/61, 61.12, 69.15, 78.01, 85.1, 85.16, 219/84
See application file for complete search history.

(56) References Cited

U.S. PATENT DOCUMENTS

| 6,861,609 B2 | 3/2005 | Sigler | 219/117.1 |
| 2008/0078749 A1 | 4/2008 | Sigler | |
| 2009/0302009 A1 | 12/2009 | Sigler | |

FOREIGN PATENT DOCUMENTS

JP 2009090340 4/2009

*Primary Examiner* — Jenny L Wagner

(57) ABSTRACT

A method for welding a plurality of aluminum to aluminum welds and a plurality of steel to steel welds using the same welder includes providing a resistance spot welder with a pair of weld electrodes having an electrode face radius of curvature in the range between 20 mm and 40 mm. The series of aluminum to aluminum welds is first made, and then, after completing the aluminum to aluminum welds, the series of steel to steel welds are made. After completing the steel to steel welds the weld electrodes are cleaned by an abrasive to remove any buildup or contamination of aluminum on the electrodes. In the event the electrodes have mushroomed, then dressing of the electrodes is provided and then the abrasive cleaning is performed to restore the surface texture.

18 Claims, 3 Drawing Sheets

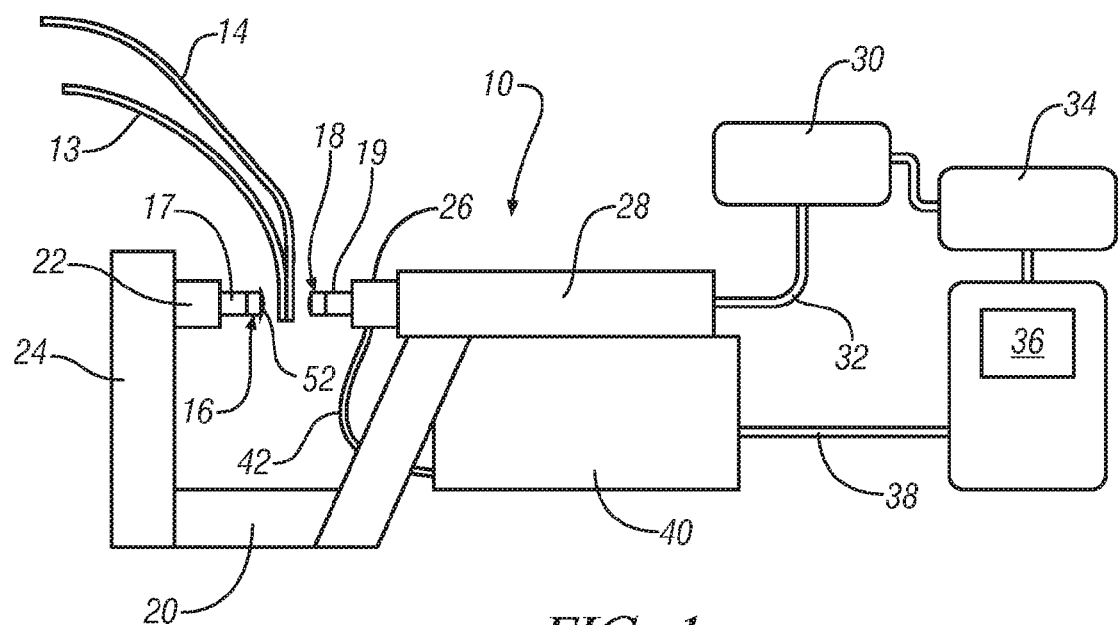
FIG. 1
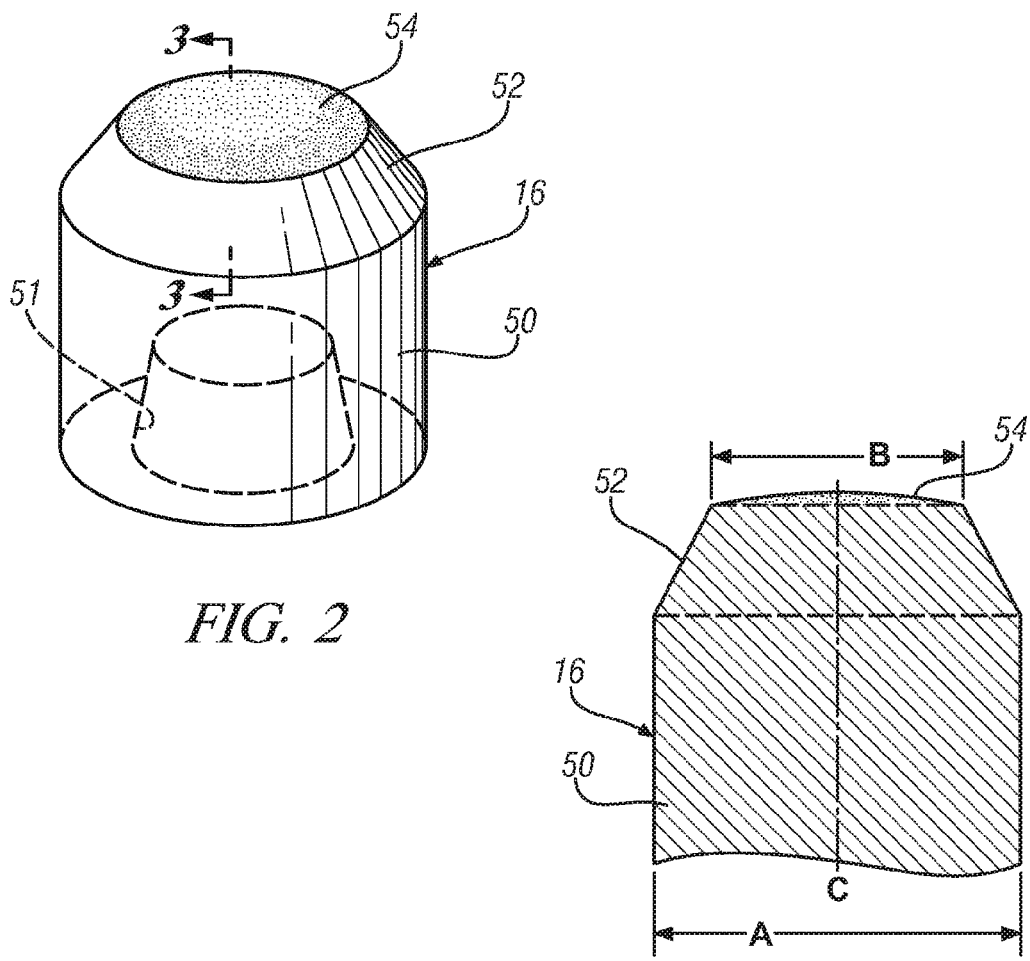
FIG. 2
FIG. 3

WELDING ELECTRODE WITH CONTOURED FACE

FIELD OF THE INVENTION

The present invention relates to welding together metal panels and more particularly provides a method for the resistance spot welding together of both aluminum to aluminum panels and steel to steel panels using a single weld gun.

BACKGROUND OF THE INVENTION

Automotive vehicle body manufacturing operations include the joining together of two sheet metal layers by resistance spot welding. The spot welding operation is typically accomplished by assembling the sheet metal panels in a suitable fixture or other clamping apparatus and then pressing welding electrodes against opposite sides of adjoining metal panels. The weld electrodes provide both clamping force and also communicate weld current to the point of contact with the metal panels.

The weld gun is typically operated by a robot so that a succession of welds can be made in a particular manufacturing cell. Manufacturing efficiencies demand that the welds be made in very rapid succession as fast as possible, to thereby reduce the number of welders and robots that are required to assemble the vehicle body.

Modern motor vehicles may typically employ both steel panels and aluminum panels in order to optimize the strength and weight characteristics of the vehicle body. Thus the welding operations for a vehicle body may include both the welding of aluminum panels to aluminum panels and also the welding of steel panels to steel panels. Steel panels are often galvanized with a zinc coating as a corrosion preventative.

With regard to the spot welding of steel, it is known that over a number of welds a copper electrode will soften and mushroom in shape because of the combined action of clamping pressure, high temperature and the alloying of the copper with the galvanized steel surface. Accordingly, the prior art has recognized that when the copper electrode is used to weld steel or galvanized steel, the electrode must be periodically dressed in order to reshape the electrode to extend its useful life and maintain weld quality.

With regard to the use of a copper electrode to weld aluminum panels, it is known that a buildup of aluminum from the aluminum sheet onto the electrode face can result in the formation of a low-melting-point Cu—Al eutectic that eventually produces pits in the electrode's surface. To minimize the pitting reaction, the prior art has recognized that the copper electrode used for welding aluminum panels needs to be occasionally resurfaced in order to remove the contamination from the surface thereof.

Thus, with respect to welding aluminum to aluminum, U.S. Pat. No. 6,861,609 assigned to the assignee of this invention provides for the texturing of the electrode face by blasting with small grit particles or sanding with course abrasive paper in order to clean and restore the face of the copper electrode. In addition, U.S. patent application Ser. No. 11/536,001, filed Sep. 28, 2006, also assigned to the assignee of this invention discloses a method for using a tool to dress the tip of the copper electrode and make a series of concentric rings thereon. Cutting or dressing the surface during the formation of the concentric rings was designed to both clean the electrode surface and produce a texture.

Thus, although the prior art has developed techniques for welding steel to steel, and techniques for welding aluminum to aluminum, the welding of steel to steel and aluminum to aluminum using one welding gun has not been done for two primary reasons. First, welding electrodes designed to spot weld one of the materials are typically not suitable for spot welding the other material. For example, a ballnose electrode used to spot weld steel causes excessive sheet deformation and weld metal expulsion when used to spot weld aluminum. Second, contamination of aluminum panels by iron-containing particles transferred by the welding electrode could cause galvanic corrosion and premature panel deterioration.

It would therefore be desirable to provide further improvements in the welding process so that a single weld gun, using the same pair of copper electrodes could make both welds of steel to steel panels and also aluminum to aluminum panels without causing the problems given above.

SUMMARY OF THE INVENTION

A method for welding a plurality of aluminum to aluminum welds and a plurality of steel to steel welds using the same welder includes providing a resistance spot welder with a pair of weld electrodes having an electrode face radius of curvature in the range between 20 mm and 40 mm. The electrode material is selected with sufficient high temperature strength that the steel welding process does not excessively soften the electrode and harm the effectiveness of the texture used for aluminum spot welding. The series of aluminum to aluminum welds is made, and then, after completing the aluminum to aluminum welds, the series of steel to steel welds are made. After completing the steel to steel welds, the weld electrodes are cleaned by an abrasive to remove any buildup or contamination of iron on the electrodes. In the event the electrodes have mushroomed, then dressing of the electrodes is provided and then the abrasive cleaning is performed to restore the surface texture.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a schematic representation of a welding apparatus using weld electrodes of this invention in spot welding of both aluminum to aluminum and steel to steel.

FIG. 2 is a perspective view of an electrode for use in the practice of this invention.

FIG. 3 is a side elevation view of the electrode of FIG. 2 having parts broken away.

DESCRIPTION OF THE PREFERRED EMBODIMENT

Figure 4:
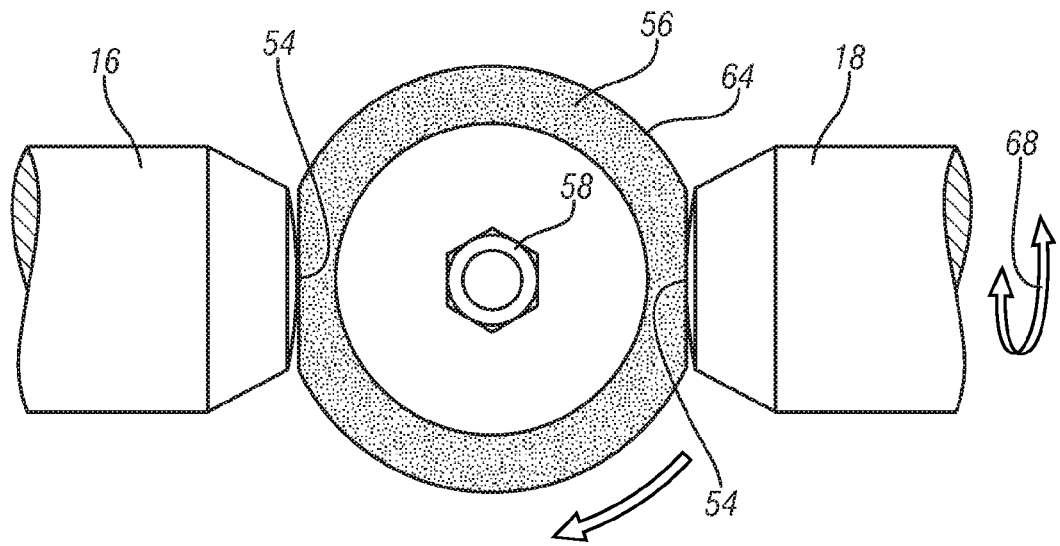
FIG. 4 is a side elevation view of a pair of electrodes being cleaned and retextured by an abrasive wheel.

FIG. 1 is a schematic illustration of a side view of a representative spot welding gun apparatus 10 with the associated equipment utilized in spot welding operations. In such an operation, an assembly of two or more sheet metal panels 13 and 14 to be welded is prepared and delivered by a conveyor or other device, to the welding gun apparatus 10. The welding gun apparatus 10 is typically mounted on a robot which moves the welding gun apparatus 10 along the sheet metal panels 13 and 14 to rapidly accomplish a succession of individual electric resistance spot welds. The metal panels 13 and 14 can both be of aluminum, or can both be steel.

In FIG. 1, the metal panels 13 and 14 are shown poised between a pair of axially aligned and opposing electrodes 16 and 18 of a welding gun arm 20. The gun arm 20 is in the configuration of a C so that the opposing electrodes 16 and 18 can be brought to bear and press upon opposite sides of the metal panels 13 and 14. In the arrangement shown, electrode 16 is mounted on a shank 17 which is inserted in a holder 22 attached to a fixed arm 24 of the welding gun arm 20. The other electrode 18 is mounted on a shank 19 and inserted in another holder 26 carried on an air cylinder or servo motor 28. Air cylinder or servo motor 28 is adapted to axially move the electrode 18 into clamping engagement with the outer surface of the panel 14. A source of high pressure air from a remote source, not shown, delivers air through a programmable air regulator 30 through air line 32 to the cylinder 28 to provide clamping force. Alternatively, a servo-motor control provides current and voltage to the servo motor to provide clamping. During a spot welding sequence, the timely application of air pressure to the air cylinder 28 or movement of the servo motor advances holder 26 so that electrode 18 presses the sheets 13 and 14 against stationary electrode 16 with a force in the order of 500 to 1,500 pounds.

Weld gun 20, typically mounted on the end of a robot arm, is connected to a robot weld controller 34. Controller 34 manages and actuates the programmable air regulator 30 and also a welding controller 36. Welding controller 36 regulates the passage of primary welding current to the welding transformer, which supplies current to the electrodes. On command of the welding controller 36 primary current is delivered through primary current line 38 to weld transformer 40. Weld transformer 40 converts the primary current to a lower voltage higher current secondary welding current which is then provided through a secondary current line 42 and electrode holder 26 as well as conductive gun arm 20 and electrode holder 22.

Turning now to FIG. 2 there is disclosed a single design of a copper electrode 16 particularly designed to accomplish both the welding together of steel panels and the welding together of aluminum panels. As seen in FIG. 2 the electrode 16 has a round body 50 with a truncated conical end 52. Body 50 has a hollow receptacle 51 adapted to receive a shank 17 for insertion into the electrode holder 22. Weld face 54 of the truncated conical end 52 is crowned. In particular, we have found that the radius of curvature of the crown of electrode weld face 54 should be in the range between 20 mm and 40 mm in order to provide an electrode that is effective to make both the aluminum to aluminum welds and steel to steel welds. We have also found that the diameter "B" of the curved weld face 54 of the electrode 16, FIG. 3, is a feature of the welding electrode design and that the diameter of the electrode weld face 54 is related to the desired nugget size of the aluminum to aluminum weld. The minimum acceptable nugget diameter for aluminum to aluminum is approximately $4 \times (t)^{1/2}$ where t is the thickness of the thinner sheet of aluminum in a two sheet stack up of aluminum. We have found that the weld face 54 diameter B should be at least 1.5 mm larger than the acceptable nugget diameter, and preferably the electrode weld face 54 diameter should be at least 3 mm larger than the acceptable nugget diameter. As an example, if the thinner of sheets of aluminum is 1 mm thick, the nugget diameter for welding 1-mm thick aluminum sheet, $4 \times (t)^{1/2} = 4$ mm, should be 4 mm, and then the diameter of the weld face 54 would be the 4 mm, plus at least 1.5 mm. Thus the diameter B would be 5.5 mm diameter. Or, preferably the diameter of the weld face 54 would be 4 mm plus 3 mm, so that the diameter would be 7 mm.

In addition, we have found that the electrode face 54 should be textured to provide a surface roughness in the range of 2 micrometers to 50 micrometers in order to penetrate the tough, adherent oxide found on aluminum materials. In addition, for the electrode to work successfully, we have determined that the electrode material must have high conductivity, have high hardness or yield strength, and be able to resist softening at elevated temperatures. The electrode yield strength should be at least 400 MPa and preferably above 500 megapascals, (MPa) in order for the texture to have sufficient durability in use. The alloy must resist softening when exposed to the high temperatures that are obtained during spot welding of steel. We have found that the alloy must not soften at a temperature of at least 400° C. and preferably greater than 500° C. Finally, the alloy must have sufficient electrical conductivity to prevent overheating during the passage of high welding current required of aluminum. This must be greater than 80% conductivity under the International Annealed Copper Standard (IACS) and preferably greater than 90% IACS.

In addition, we have determined that during welding operations where (the use of) a single weld gun is used to make welds in both aluminum panels and steel panels, it should include the completion of all of the aluminum to aluminum welds, before making the steel to steel welds. In particular, we have found that making of the steel to steel weld will cause the buildup of zinc and iron contamination on the copper electrodes which will then be transferred to the aluminum panels and interfere with obtaining an effective corrosion resistant weld in the aluminum panel. However, although aluminum will be picked up by the electrode during the making of the aluminum to aluminum weld, we have found that the contamination of the steel weld with aluminum is not as problematic as the contamination of the aluminum weld with the zinc and iron. Accordingly, it is determined that the succession of aluminum to aluminum welds should be completed prior to making the steel to steel welds thereby avoiding the condition in which contamination resulting from the steel to steel welds could be transferred to the aluminum to aluminum welds. In addition, the making of steel to steel weld degrades the texturing faster than the making of aluminum to aluminum welds, thus also indicating that the aluminum to aluminum welds should be made prior to making the steel to steel welds.

It is also determined that subsequent to making the succession of steel to steel welds, the electrodes should then be cleaned and textured prior to again starting the aluminum to aluminum welds. Cleaning and texturing of the electrodes prior to aluminum to aluminum welding insures that no iron or zinc contamination from galvanized steel panels is transferred to the aluminum panels and that the electrode has a texture suitable for aluminum welding.

In addition, if extended aluminum welding is anticipated, the aluminum welding can be temporarily stopped and an intermediate cleaning and texturing operation can be done to restore the texture and remove any buildup of aluminum, thus avoiding the corrosion and pitting of the electrode face 54 that can be caused when too many aluminum to aluminum welds are attempted.

This cleaning/texturing of the weld electrodes can be accomplished most effectively by use of a flexible abrasive media such as a rubber backed silicon wheel, a Scotch-Brite wheel, or a stainless steel wire wheel to both clean the electrodes and restore the desired surface texture. Thus, the weld gun robot aligns the weld gun with the abrasive material and then the abrasive material can be rotated against the electrode face. Alternatively, the abrasive material can be held stationary and the robot can rotate or translate the electrode face across the surface of a fixed abrasive material. The abrasive both removes the buildup of aluminum and also creates a series of grooves or ridges in the surface to restore the desired surface texture. The cleaning process must remove all the contamination that has built up and do it in a sufficiently short time as not to interfere with production.

FIG. 4 shows the example of a flexible media wheel 56 rotating on a horizontal shaft 58 with the opposed electrodes 16 and 18 pressing on the rim 64 of the flexible media wheel 56. The robot may rotate the electrodes 16 and 18 back and forth in the direction of arrows 68 so that all of the crowned surface of the face 54 of the electrodes is contacted uniformly by the rim 64 of the flexible media wheel 56.

Figure 5:
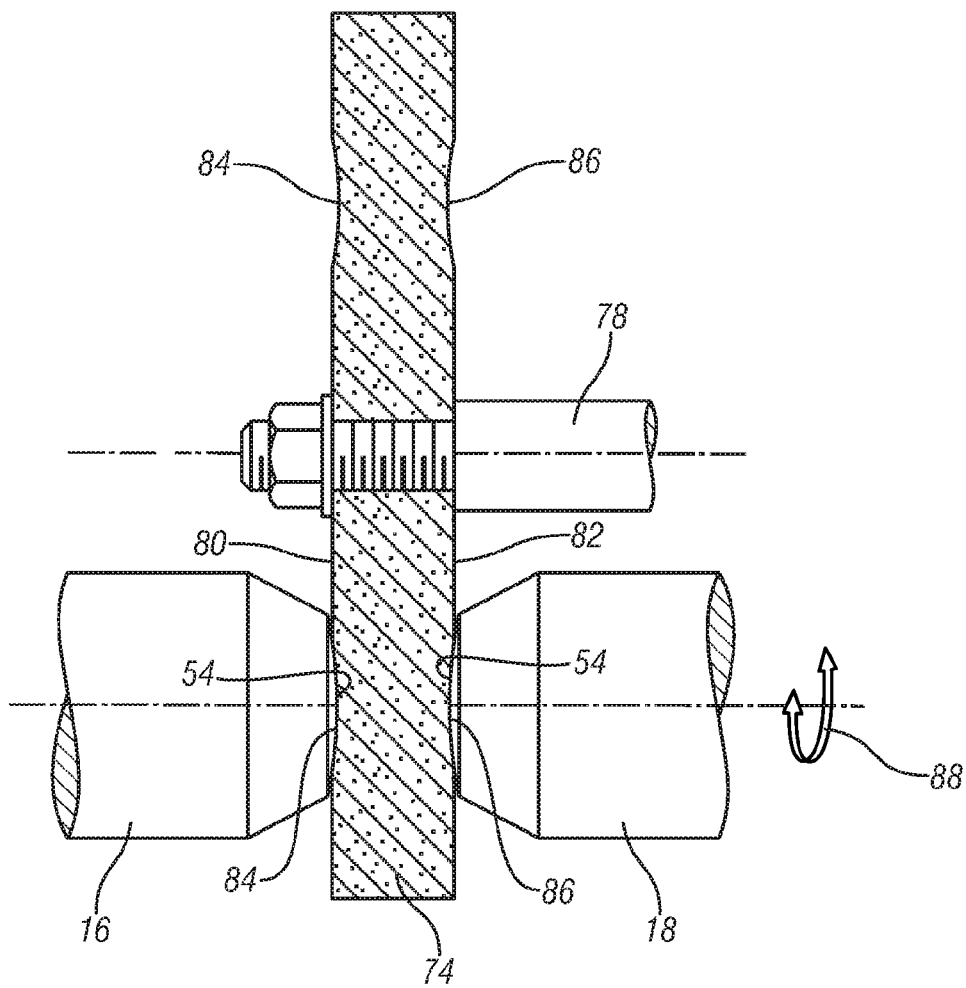
FIG. 5 is another side elevation view of the pair of electrodes being cleaned and retextured by an abrasive wheel.

FIG. 5 shows another example of a rigid abrasive wheel 74 rotating on a horizontal shaft 78 with the opposed electrodes 16 and 18 pressing on the opposite faces 80 and 82 of the rotating abrasive wheel 74. In FIG. 5 the abrasive wheel 74 is a rigid abrasive wheel with curved bottom grooves 84 and 86 that fit the curvature of the electrode face 54. The robot may rotate the electrodes 16 and 18 back and forth in the direction of arrows 88 so that all of the surface of the electrode face 54 of the electrodes 16 and 18 will be contacted uniformly by the faces 80 and 82 of the abrasive wheel 74.

Figure 6:
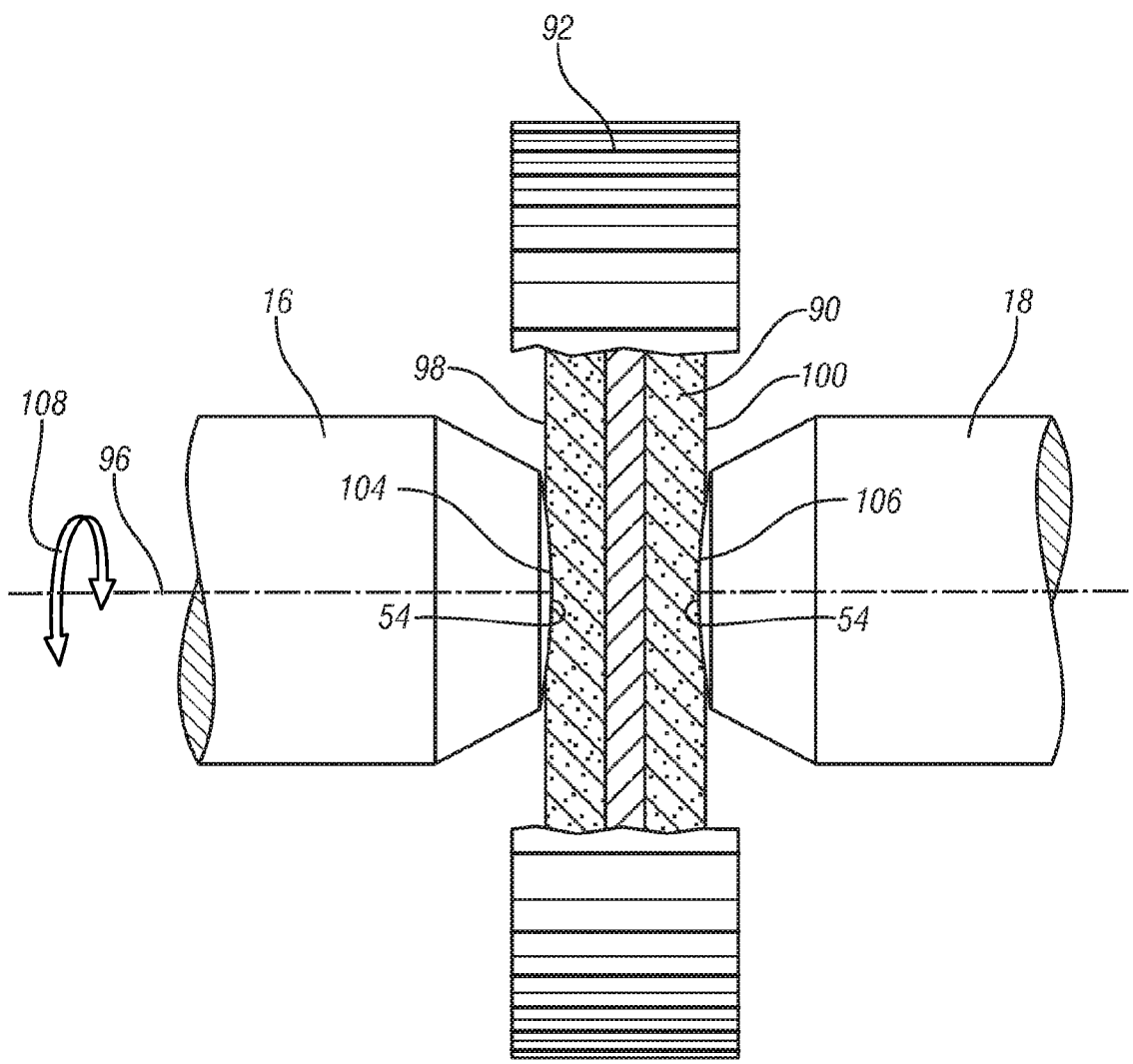
FIG. 6 is another side elevation view of a pair of electrodes being cleaned and retextured by an abrasive wheel.

FIG. 6 shows another example of a rotating abrasive wheel 90 which is captured in a rotating gear 92 that rotates on an axis 96 that is coincident with the axis of the opposed electrodes 16 and 18, which press on the opposite faces 98 and 100 of rotating abrasive wheel 90. In FIG. 6 the abrasive wheel 90 can be a rigid abrasive wheel with curved bottom grooves 104 and 106 that fit the curvature of the electrode face 54. Or the abrasive wheel can be a flexible media that yields to the crowned shape of the electrode face.

In addition, we have found that the method should include the monitoring of the electrodes for the occurrence of mushrooming, which typically occurs during spot welding of steel due to the high temperatures and pressures encountered. Monitoring is most easily accomplished using robot-mounted, servo-gun equipment with sensors to monitor the servo ram displacement. The length of each electrode can be determined by having the robot bring the stationary electrode in contact with a reference block, such as a block of steel mounted at a fixed location. Monitoring of the robot motion required to contact the stationary electrode will give the length of the stationary electrode. Closing of the servo gun and monitoring the ram motion will give the length of the movable electrode. Comparing the electrode length to that determined at an earlier time is used to determine the shortening of the electrode due to mushrooming. Once one of the electrodes has reached a predetermined degree of shortening, the electrodes would be redressed and a new length reference point determined. For servo-guns not mounted on robots, gun closure can still determine electrode length change, but closure will give the total change of both electrodes and not the length change of individual electrodes. Determination of electrode length would preferably be done while panels were being transported between stations and no welding was underway. Preferably the amount of shortening would not exceed 0.1 mm before dressing is initiated. Alternatively, the robot control would be designed to track the number of welds made, particularly steel welds, and at a predetermined count, initiate dressing. The electrodes are dressed to restore the shape of FIG. 2. Electrode dressing equipment and processes are well known in the prior art, in order to restore the shape of the electrode to that of FIG. 2. In particular, the dressing operation removes the mushroomed material and restores the desired face diameter and radius of curvature to the electrode face 54. After being dressed to restore the proper shape, the electrodes are again abraded by the abrasive material in order to restore the desired textured surface.

Thus, it is seen that the invention provides a new and improved welding method that can accomplish the welding together of both aluminum to aluminum panels and steel to steel panels by a single weld gun in a single manufacturing cell.

The invention claimed is:

1. A method for welding a plurality of aluminum to aluminum and plurality of steel to steel electric resistance welds using the same welder comprising:
providing a resistance spot welder with a pair of weld electrodes having an electrode face radius of curvature in the range between 20 millimeters and 40 millimeters and said electrode face being textured with a roughness in the range of 2 micrometers to 50 micrometers;
first making a series of aluminum to aluminum welds;
after completing the aluminum to aluminum welds, then making a series of steel to steel welds;
after completing the steel to steel welds then cleaning the weld electrodes to remove any buildup of aluminum on the electrodes and retexturing the electrode face to the roughness of 2 micrometers to 50 micrometers prior to next beginning a new series of aluminum to aluminum welds.

2. The method for welding of claim 1 further comprising, in the event the electrodes have mushroomed, then dressing the electrodes.

3. The method of claim 1 further comprising after completing the steel to steel welds, measuring the electrodes to determine the extent of mushrooming of the electrode and if mushrooming is determined then redressing the electrodes prior to retexturing the electrodes.

4. The method of claim 1 further comprising the yield strength of the copper electrode being least 400 MPa.

5. The method of claim 1 further comprising the yield strength of the copper electrode preferably being above 500 MPa.

6. The method of claim 1 further comprising the electrodes being of a copper alloy that does not soften at a temperature of 400° C.

7. The method of claim 1 further comprising the electrode having an electrical conductivity of greater than 80% IACS conductivity and preferably greater than 90% IACS.

8. The method of claim 1 further comprising the cleaning and retexturing being performed by a rotating abrasive wheel.

9. The method of claim 8 further comprising the rotating wheel being a rigid abrasive wheel having groove therein with a radius of curvature in the range between 20 millimeters and 40 millimeters.

10. The method of claim 8 further comprising the rotating wheel being a flexible abrasive material that flexes to match the curvature of the electrode face.

11. The method of claim 1 further comprising if the number of aluminum to aluminum welds is determined to cause excessive pitting or buildup of aluminum on the electrodes, then temporarily stopping the aluminum to aluminum welding to perform an intermediate cleaning and texturing of the electrode faces prior to competing the aluminum to aluminum welds and proceeding to the steel to steel welds.

12. A method for welding a plurality of aluminum to aluminum and plurality of steel to steel electric resistance welds using the same welder comprising:

provide a resistance spot welder with a pair of weld electrodes having an electrode face radius of curvature in the range between 20 millimeters and 40 millimeters, said electrode face being textured with a roughness in the range of 2 micrometers to 50 micrometers, the yield strength of the copper electrode being at least 400 MPa, electrodes being of a copper alloy that does not soften at a temperature of 400° C., the electrodes having an electrical conductivity of greater than 80% IACS conductivity and preferably greater than 90% IACS;

first making the series of aluminum to aluminum welds;

after completing the aluminum to aluminum welds, then making the series of steel to steel welds;

after completing the steel to steel welds then cleaning the weld electrodes to remove any buildup of aluminum on the electrodes and retexturing the electrode face to the roughness of 2 micrometers to 50 micrometers prior to next beginning a new series of aluminum to aluminum welds.

13. The method for welding of claim 12 further comprising, in the event the electrodes have mushroomed, then dressing the electrodes.

14. The method of claim 12 further comprising after completing the steel to steel welds, measuring the electrodes to determine the extent of mushrooming of the electrode and if mushrooming is determined then redressing the electrodes prior to retexturing the electrodes.

15. The method of claim 12 further comprising the cleaning and retexturing being performed by a rotating abrasive wheel.

16. The method of claim 15 further comprising the rotating wheel being a rigid abrasive wheel having groove therein with a radius of curvature in the range between 20 millimeters and 40 millimeters.

17. The method of claim 16 further comprising the rotating wheel being a flexible abrasive material that flexes to match the curvature of the electrode face.

18. The method of claim 12 further comprising if the number of aluminum to aluminum welds is determined to cause excessive pitting or buildup of aluminum on the electrodes, then temporarily stopping the aluminum to aluminum welding to perform an intermediate cleaning and texturing of the electrode faces prior to competing the aluminum to aluminum welds and proceeding to the steel to steel welds.

* * * * *